March 29, 1932.　　F. J. RAYBOULD　　1,851,729
CONDUIT FITTING

Filed May 23, 1930

Frank J. Raybould
INVENTOR.

BY
ATTORNEYS.

Patented Mar. 29, 1932

1,851,729

UNITED STATES PATENT OFFICE

FRANK J. RAYBOULD, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed May 23, 1930. Serial No. 454,944.

The present invention is designed to provide an efficient connector. It is particularly useful in connecting conduits with conduit fittings. Through it a threadless conduit may be readily attached to a threaded conduit fitting. Features and details of the invention will appear from the specification and claims.

A preferred embodiment of the invention is illustrated in the accompanying drawings as follows:—

Figure 1:
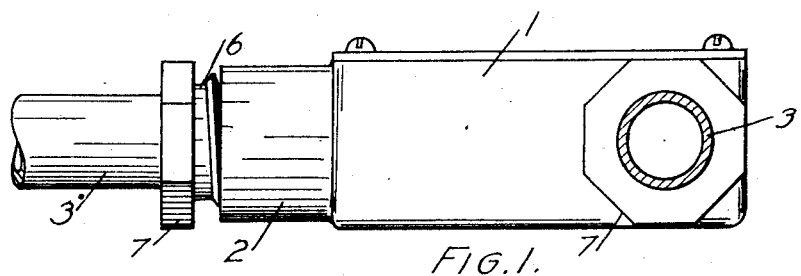
Figure 2:
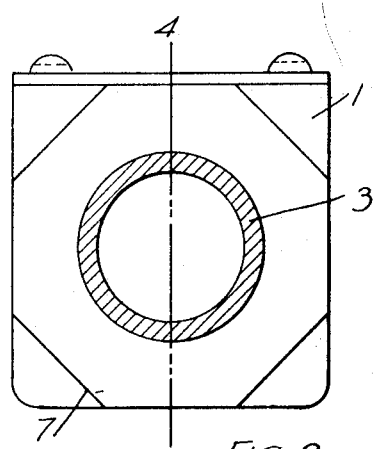
Figure 3:
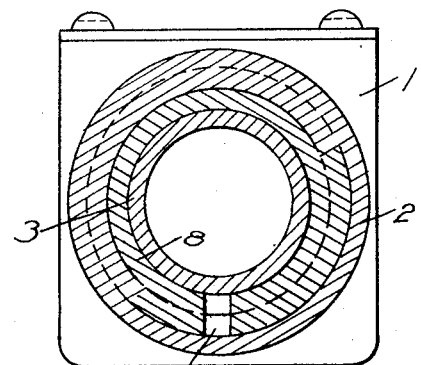
Figure 4:
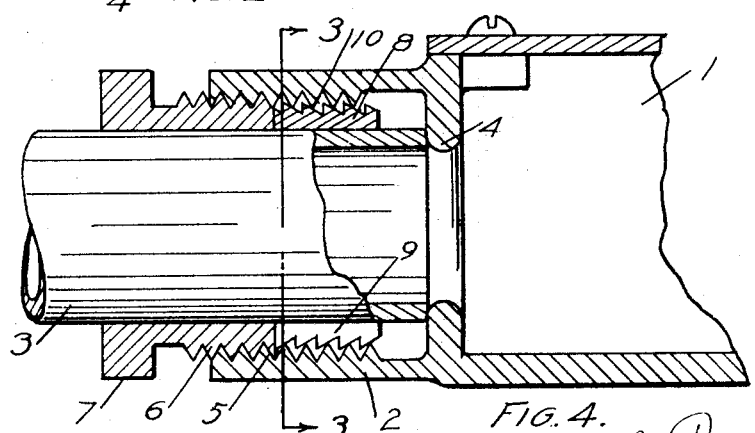

Fig. 1 shows a side elevation.
Fig. 2 an enlarged end view.
Fig. 3 a section on the line 3—3 in Fig. 4.
Fig. 4 a section on the line 4—4 in Fig. 2.

1 marks a conduit box, 2 a conduit-receiving extension on the box, and 3 a conduit. The conduit extension terminates with a guard shoulder 4 and is provided with an internal screw thread 5 into which ordinarily a conduit may be directly screwed.

The screw threads 5 have the usual thread slopes of approximately 30° to the axis. A follower 6 is threaded into the end of the extension and is provided with a wrench-hold 7. A sleeve 8 is split at 9 and is formed with a buttress thread 10, the buttress thread being of the same pitch as the thread 5 and having the slopes of the threads facing inwardly.

In operation the split sleeve 8 and follower are threaded into the extension. The conduit is then put in place and the follower turned up. The slopes 10 operate as continuous wedges on the crests of the threads 5 and contract the split sleeve throughout its length and equally so as to clamp the conduit. This not only makes a very efficient connector but also as an original construction it has utility in that an ordinary threaded fitting can be readily adapted to secure a threadless conduit.

What I claim as new is:—

1. In a connector, the combination of a member having a screw thread; a split sleeve having a buttress thread of the same pitch as the thread of the member, said threads being screwed together and the inclined slopes of the buttress thread having wedging engagement with the threads of the screw of the member; and a pressure screw acting with the screw threads of the member to exert axial pressure on the sleeve to force it radially into clamping engagement.

2. In a connector, the combination of a member having an internal screw thread therein; a split sleeve having a buttress thread of the same pitch as the thread of the member, the split sleeve being screwed into the member; and a pressure screw screwed into the thread of the member and acting on the split sleeve to force the split sleeve axially to contact the same.

3. In a connector, the combination of a member having a screw thread with a slope of 30° inclination to the axis; a split sleeve having a buttress thread of the same pitch threads as the member, the threads of said member and said buttress thread being screwed together and the inclined slopes of the buttress thread having a wedging engagement with the screw threads of the member; and a pressure screw acting with the screw threads of the member to exert pressure on the sleeve to actuate it radially.

4. In a connector, the combination of a member having an internal screw thread therein, the slopes of said screw thread having approximately 30° inclinations to the axis; a split sleeve having a buttress thread of the same pitch screwed into the member, the inclined slopes of the buttress thread forming a wedging engagement with the threads of the member; and a pressure screw screwed into the member against the split sleeve and forcing the slopes of the buttress thread against the threads of the member to contract the sleeve.

5. In a conduit fitting, the combination of a conduit box having a conduit-receiving extension, said conduit receiving extension having an internal thread with slopes approximately 30° inclination to the axis; a split sleeve having a buttress thread of the same pitch screwed into the extension; and a follower screwed into the extension against the split sleeve exerting pressure thereon to force the slopes of the buttress thread against the threads of the extension to contract the split sleeve.

In testimony whereof I have hereunto set my hand.

FRANK J. RAYBOULD.